No. 758,251. PATENTED APR. 26, 1904.
O. HEYNSOHN.
PROPELLING GEAR FOR TRICYCLES.
APPLICATION FILED AUG. 14, 1903.
NO MODEL.
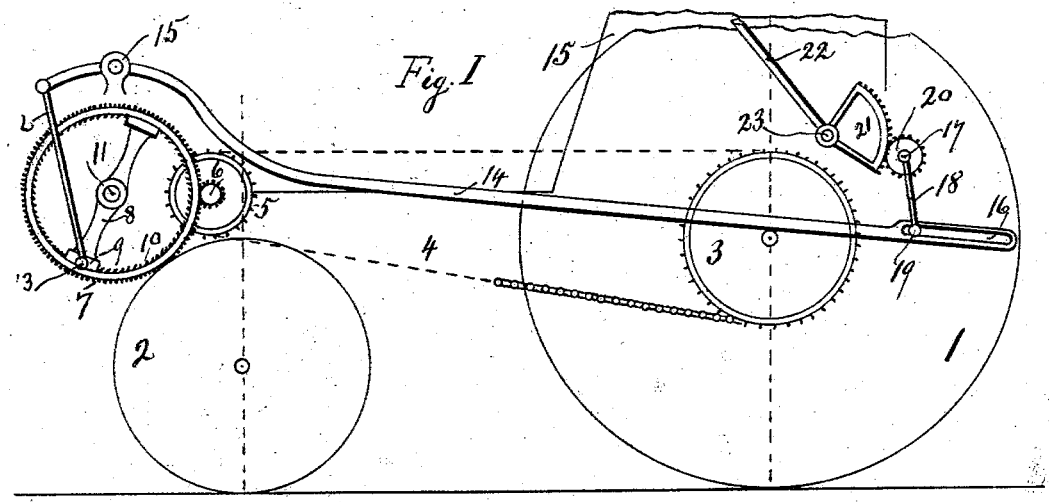
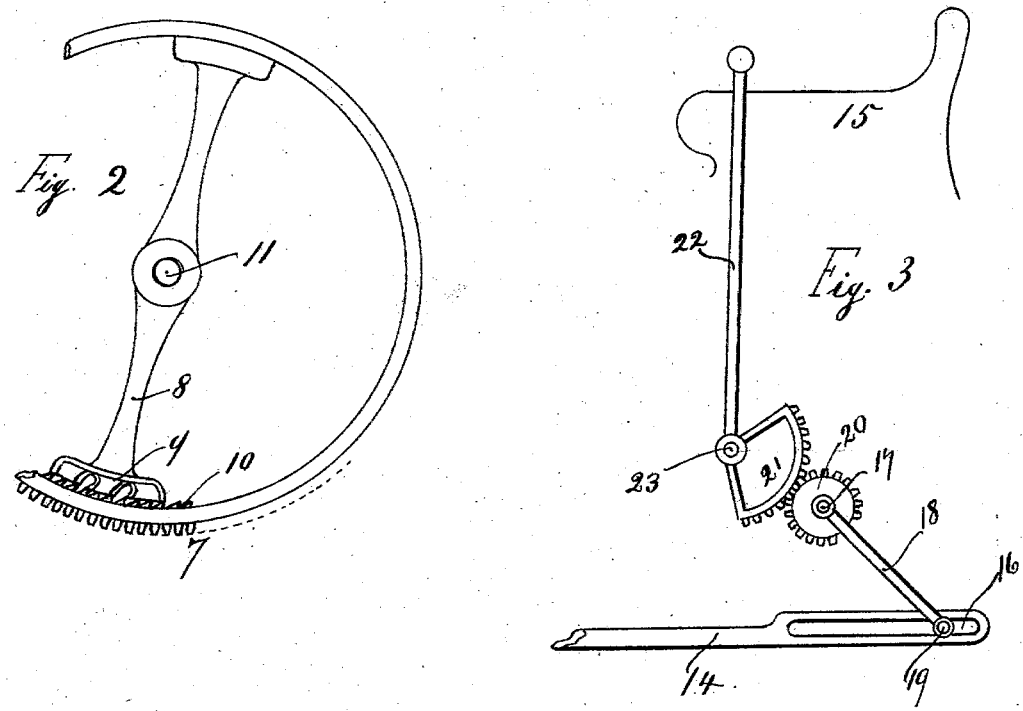
WITNESSES
INVENTOR No. 758,251. Patented April 26, 1904.

UNITED STATES PATENT OFFICE.

OTTO HEYNSOHN, OF SAN CARLOS, COSTA RICA.

PROPELLING-GEAR FOR TRICYCLES.

SPECIFICATION forming part of Letters Patent No. 758,251, dated April 26, 1904.

Application filed August 14, 1903. Serial No. 169,482. (No model.)

*To all whom it may concern:*

Be it known that I, OTTO HEYNSOHN, a citizen of the United States, residing at San Carlos, Republic of Costa Rica, have invented certain new and useful Improvements in Propelling-Gear for Tricycles, &c., of which the following is a specification.

This invention relates to propelling-gear for tricycles and other light vehicles.

The object of the invention is to produce a hand-propelled vehicle, preferably a tricycle, in which the power of the driver or drivers exerted through a hand-lever is economically and effectively applied to the driving wheel or wheels.

The invention consists in certain constructions and combinations hereinafter set forth and claimed.

Figure 1 is a side elevation of the propelling-gear, showing in outline so much of a vehicle as may be needed to illustrate the general relation of parts. Fig. 2 is a side elevation, partly sectioned and partly broken away, showing a form of rotating clutch for use in said propelling mechanism. Fig. 3 is a broken detail elevation of mechanism connecting the compound levers.

I do not herein attempt to illustrate the frame and other old parts of the vehicle, as almost any usual form of tricycle or a light four-wheeled vehicle may be used.

The numeral 1 indicates the driving wheel or wheels, and 2 a steering-wheel, of such a vehicle. A sprocket-wheel 3 on the driving-wheel or its axle is driven by a drive-chain 4 from a driven sprocket-wheel 5, as is common in vehicles of this general character. The sprocket-wheel 5 is driven by a gear 7, engaging a pinion 6 on the axle or otherwise in fixed connection to wheel 5. The gear 7 is preferably driven rotatively by an internal rocking clutch 8, having spring-pawls 9, one or more in number, which pawls engage internal ratchet-teeth 10 on the gear 7. The rocking clutch 8 is pivoted to swing on the axle 11 of gear 7. A pitman 12 is connected to the rocking clutch by a wrist-pin 13 or otherwise. This pitman receives reciprocating motion from a long transmitting-lever 14. The transmitting-lever 14 has its fulcrum on a suitable support 15 near the driving gear-wheel 7. The long arm of lever 14 extends rearwardly toward the position of the operator, who may occupy seat 15. Lever 14 may conveniently extend alongside said seat. In the long arm of lever 14 there is a slot 16. A rock-shaft 17, suitably supported on the vehicle, has a crank-lever 18, which has its arm 19 in the slot 16 of lever 14. The rock-shaft 17 has a pinion 20, rigidly attached. A geared sector 21 engages said pinion. The sector 21 is rigid with hand-lever 22, and the fulcrum 23 of said hand-lever and sector is at such distance from the pinion 20 that the gears on said sector and pinion are in constant engagement. The rocking of lever 22 backward and forward rocks shaft 17 through the geared mechanism described. Rock-shaft 17 by means of its crank-lever 18 causes the rear end of lever 14 to rise and fall. Through the pitman 12 and clutch-gear connected thereto the gear 7 is rotated, and this conveys rotating motion to the drive-wheels through the train of mechanism described.

I have made no attempt to describe or illustrate the steering and brake mechanism of the vehicle, although such will be used. Any usual mechanisms for such purposes may be employed.

From the above description it is believed a person skilled in this art will be able to make and use my invention.

The compound lever formed by the hand and transmitting levers permits the application of very great power to the rotation of the driving-wheels. When the machine is in motion, the failure of the transmitting-lever to vibrate will not stop the machine, as the drive-wheels may move forward and carry the clutch mechanism with them.

What I claim is—

1. In a hand-propelled vehicle, the combination of a hand-lever, a sector-gear rigid therewith, a pinion engaged by said sector-gear and rigid with a rock-shaft, a crank-lever connected to said rock-shaft and having its crank-arm extending therefrom, a transmitting-lever having a slot into which said crank-arm extends, and mechanism actuated by the transmitting-lever to rotate the drive-wheel.

2. In a vehicle driving-gear, the combination of a long transmitting-lever, fulcrumed near the front of the vehicle, and having driving means leading from the front of said lever to rear drive-wheels, a crank-lever engaging a slot in the rear of said transmitting-lever to oscillate the same, and means for oscillating said crank-lever.

3. In a vehicle driving-gear, the combination of a hand-lever having a sector-gear rigid therewith, a pinion engaged by said sector-gear, a rock-shaft driven by said pinion and having a crank-lever connected thereto, a transmitter-lever having a slot with which said crank-lever engages, and means by which the transmitter-lever conveys rotary motion to the drive-wheels.

4. In a vehicle driving-gear, a long transmitter-lever having its fulcrum near the front of the vehicle, a pitman and a clutch connected to said transmitter-lever and a driving-pinion actuated from said clutch, a driving-train leading from said pinion to the rear driving-wheels of the vehicle, a hand-lever near the rear of the vehicle, and connections from said hand-lever to the transmitter-lever by which the same is actuated.

5. In a vehicle driving-gear, the combination of a hand-lever having a sector-gear rigid therewith, a pinion engaged by said sector-gear, a crank-lever connected to said pinion, a transmitting-lever pivoted near the front of the vehicle and engaged by the crank of said crank-lever, a pitman connected to said transmitter-lever and a clutch connected to said pitman, and a pinion actuated from said clutch, and driving mechanism extending from the last-mentioned clutch to the drive-wheels.

In testimony whereof I affix my signature in presence of two witnesses.

OTTO HEYNSOHN.

Witnesses:
W. A. BARTLETT,
M. E. BROWN.